(12) United States Patent
Gogoi

(10) Patent No.: US 9,854,017 B2
(45) Date of Patent: Dec. 26, 2017

(54) RESILIENCE IN THE PRESENCE OF MISSING MEDIA SEGMENTS IN DYNAMIC ADAPTIVE STREAMING OVER HTTP

(71) Applicant: QUALCOMM Incorporated, San Diego, CA (US)

(72) Inventor: Tony Gogoi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 13/838,595

(22) Filed: Mar. 15, 2013

(65) Prior Publication Data

US 2014/0280754 A1 Sep. 18, 2014

(51) Int. Cl.
| | |
|---|---|
| *G06F 15/16* | (2006.01) |
| *H04L 29/06* | (2006.01) |
| *H04N 21/2343* | (2011.01) |
| *H04N 21/2365* | (2011.01) |
| *H04N 21/262* | (2011.01) |
| *H04N 21/44* | (2011.01) |
| *H04N 21/442* | (2011.01) |
| *H04N 21/6547* | (2011.01) |
| *H04N 21/845* | (2011.01) |

(52) U.S. Cl.
CPC ....... *H04L 65/601* (2013.01); *H04N 21/2365* (2013.01); *H04N 21/234327* (2013.01); *H04N 21/26258* (2013.01); *H04N 21/44016* (2013.01); *H04N 21/44209* (2013.01); *H04N 21/6547* (2013.01); *H04N 21/8456* (2013.01)

(58) Field of Classification Search
CPC .................................................. H04L 65/601
USPC ......................................................... 709/219
See application file for complete search history.

(56) References Cited

U.S. PATENT DOCUMENTS

| | | | |
|---|---|---|---|
| 8,265,140 B2 | 9/2012 | Mehrotra | |
| 2005/0210356 A1 | 9/2005 | Chou et al. | |
| 2009/0100125 A1* | 4/2009 | McDowell | 709/203 |
| 2009/0279615 A1* | 11/2009 | Au et al. | 375/240.27 |
| 2010/0033622 A1* | 2/2010 | Bellers et al. | 348/448 |
| 2010/0073371 A1* | 3/2010 | Ernst | G09G 5/393 345/428 |
| 2010/0332671 A1 | 12/2010 | Alfonso et al. | |
| 2011/0231519 A1* | 9/2011 | Luby | H04N 21/23106 709/219 |
| 2012/0233345 A1* | 9/2012 | Hannuksela | H04N 21/26258 709/231 |

(Continued)

OTHER PUBLICATIONS

Yago Sanchez, iDASH: Improved Dynamic Adaptive Streaming over HTTP using Scalable Video Coding, ACM Multimedia systems, Feb. 23, 2011, http://delivery.acm.org.*

(Continued)

*Primary Examiner* — Minh-Chau Nguyen
(74) *Attorney, Agent, or Firm* — The Marbury Law Group, PLLC

(57) ABSTRACT

Systems, methods, and devices enabling scalability to be incorporated into a media presentation such that the media presentation at a client end may be continuous or at least substantially continuous in the presence of missing segment files. In an embodiment, the loss of one or more segment file may not require a media presentation interval associated with the missing segment file to be skipped at the client end. Systems, methods, and devices enable scalability in live streaming and/or on-demand presentations.

41 Claims, 14 Drawing Sheets

(56) References Cited

U.S. PATENT DOCUMENTS

| | | | |
|---|---|---|---|
| 2012/0259946 A1* | 10/2012 | Stockhammer | H04L 65/105 709/217 |
| 2012/0331106 A1* | 12/2012 | Ramamurthy et al. | 709/218 |
| 2013/0007223 A1* | 1/2013 | Luby | H04N 21/23106 709/219 |
| 2013/0044807 A1* | 2/2013 | Lamy-Bergot et al. | 375/240.03 |
| 2013/0060956 A1* | 3/2013 | Nagaraj | H04N 21/4384 709/231 |
| 2013/0091251 A1* | 4/2013 | Walker et al. | 709/219 |
| 2013/0142332 A1* | 6/2013 | Ramos | G06Q 30/01 380/236 |
| 2013/0238758 A1* | 9/2013 | Lee et al. | 709/218 |
| 2013/0330055 A1* | 12/2013 | Zimmermann | H04N 21/2743 386/240 |
| 2014/0156800 A1* | 6/2014 | Falvo | 709/219 |

OTHER PUBLICATIONS

Apostolopoulos J.G., "Error-Resilient Video Compression via Multiple State Streams," International Workshop on Very Low Bitrate Video Coding (VLBV'99), Oct. 1999, pp. 1-4.

Gusella R., et al., "Distribution of Video to the Home: Cell or Circuit?," Hewlett Packard, Mar. 1994, pp. 1-11.

Kim J., et al., "Distributed Video Streaming Using Unbalanced Multiple Description Coding and Forward Error Correction," Global Telecommunications Conference, 2003. Globecom '03. IEEE, Dec. 2003, vol. 6, pp. 3553-3557.

Muller C., et al., "Using Scalable Video Coding for Dynamic Adaptive Streaming over HTTP in mobile environments", Signal Processing Conference (EUSIPCO), 2012 Proceedings of the 20th European, IEEE, Aug. 27, 2012 (Aug. 27, 2012), pp. 2208-2212, XP032254393, ISBN: 978-1-4673-1068-0 the whole document.

Partial International Search Report—PCT/US2014/028438—ISA/EPO—dated Aug. 5, 2014.

Sanchez Y., et al., "iDASH: Improved Dynamic Adaptive Streaming over HTTP using Scalable Video Coding", ACM Multimedia Systems, Feb. 23, 2011 (Feb. 23, 2011), XP055124640, Retrieved from the Internet: URL:http://delivery.acm.org [retrieved on Jun. 23, 2014] the whole document.

Schierl T., et al., "Priority-based Media Delivery using SVC with RTP and HTTP streaming", Multimedia Tools and Applications, Kluwer Academic Publishers, BO, vol. 55, No. 2, Sep. 18, 2010 (Sep. 18, 2010), pp. 227-246, XP019939627, ISSN: 1573-7721, DOI: 10.1007/S11042-010-0572-5 section 3, 1,2, p. 232-233.

Chou P.A., et al., "Layered Multiple Description Coding", Proceeding of the Packet Video Workshop 2003, Nantes, France, Apr. 2003, Apr. 1, 2003 (Apr. 1, 2003), pp. 1-7, XP002638181, the whole document.

International Search Report and Written Opinion—PCT/US2014/028438—ISA/EPO—Oct. 30, 2014.

Padmanabhan V.N., et al., "Resilient peer-to-peer streaming", Network Protocols, 2003. Proceedings, 11th IEEE International Conference on Nov. 4-7, 2003, Piscataway, NJ, USA, IEEE, Nov. 4, 2003 (Nov. 4, 2003), XP010671250, pp. 1-12, DOI: 10.1109/ICNP. 2003.1249753 ISBN: 978-0-7695-2024-7 section III. "Multiple Description Coding"; p. 5-p. 5; figures 2,3.

Gan T., et al., "Reducing video-quality fluctuations for streaming scalable video using unequal error protection, retransmission, and interleaving", IEEE Transactions on Image Processing, vol. 15, No. 4, Apr. 1, 2006 (Apr. 1, 2006), pp. 819-832, XP055200573, ISSN: 1057-7149, DOI: 10.1109/TIP.2005.863960.

Orozco E., et al., "Multiple Description Coding for Voice over IP using Sinusoidal Speech Coding", IEEE International Conference on Acoustics, Speech and Signal Processing (ICASSP), France May 14-19, 2006, Piscataway, NJ, USA, IEEE, Piscataway, NJ, USA, May 14, 2006 (May 14, 2006), 4 pages, XP031386230, ISBN: 978-1-4244-0469-8.

* cited by examiner

RESILIENCE IN THE PRESENCE OF MISSING MEDIA SEGMENTS IN DYNAMIC ADAPTIVE STREAMING OVER HTTP

BACKGROUND

Dynamic Adaptive Streaming over HTTP ("DASH") is a streaming standard intended to support a media-streaming model for delivery of media content in which control of the session lies exclusively with the client. Clients may request data using the Hypertext Transfer Protocol ("HTTP") from a DASH server, which is an HTTP server that may include one or more DASH-specific capabilities.

In DASH, each media-segment represents a collection of contiguous media data. Each media segment is present in a segment-file hosted by a DASH server. A segment-file is the concatenation of one or more contiguous media segments.

DASH supports both on-demand streaming and live streaming. In on-demand streaming, the entire media presentation is fetchable from the DASH server when any part of media presentation is fetchable. In live streaming, the entire media presentation is not necessarily fetchable when a part of the media presentation is fetchable from the DASH server. When a part of the media presentation is fetchable, it is typically constrained by the availability window of that part of the presentation. Typically, a live stream is captured, encoded and transmitted to the DASH server in (near) real time. Hence, a live stream may be unbounded and parts of the media presentation may be fetchable from the DASH server in the future and parts of the media presentation that were fetchable earlier may no longer be fetchable. The availability window sets the bounds in terms of when a part of the media presentation is fetchable from the DASH server.

In live streaming, a media presentation is typically captured, encoded into segment-files, and transmitted by the content source on the fly to the DASH server. The DASH server is required to host parts of the media presentation at times defined by the segment availability window of those parts in the playlist file. The DASH server typically would not perform post processing on the segment-files that it receives and its main purpose is typically to host the segment-files (including files that contain meta data corresponding to the media presentation if not present in the segment files) and signal to the client a description and the availability windows of each segment file via the playlist file.

In live-streaming, the DASH server must honor client requests for the parts of the media presentation that are within the bounds of their availability windows. The DASH server is not required to honor requests for the parts of the media presentation for which the availability window has passed (the DASH server could have deleted those to free up space on disk) or for which the availability window has not yet been reached (the DASH server will receive those parts of the media presentation from the content source in the future).

For live streaming, there is typically: 1) a content-source which continuously captures a live scene, encodes parts of the media presentation into segment-files, and transmits them to a DASH server on the fly; 2) the DASH server which receives and hosts the segment-files for clients and provides necessary information of these segment files in the playlist file; and 3) a client which fetches segment-files from the DASH server at times constrained the availability windows of the segment files and plays out the media presentation.

While the transport between the DASH server and client is typically reliable given it is over HTTP, the transport between the content source and the DASH server may not be reliable. This unreliability may result in one or more segment files getting dropped from the content source to the DASH server. In addition, even through the transport between the DASH server and the client may be reliable, the transport mechanism between the DASH server and client may be transient because it needs to be periodically torn down and re-established. During the time the transport between the DASH server and client is non-existent (e.g., torn down), the availability window of media segments may have shifted. This may result in the client not being able to fetch segments for which the availability window has passed. In case a segment file is missing, the client would need to skip over the interval of the media presentation associated with the missing segment-file. This skip over may result in diminished quality of user experience at the client, such as observed media presentation stalls during live playback. As examples, missing segments and skip over may result when problems occur in enhanced Multimedia Broadcast Multicast Services ("eMBMS") links between an encoder and a DASH server, problems occur with a mobile device acting as a content source, and/or temporary losses occur in the transport connection between a DASH client and a DASH server after which segments are no longer available at the DASH server.

SUMMARY

The systems, methods, and devices of the various embodiments enable scalability to be incorporated into a media presentation such that the media presentation at a client end may be continuous or at least substantially continuous in the presence of missing segment files. In an embodiment, the loss of one or more segment file may not require a media presentation interval associated with the missing segment file to be skipped at the client end. The systems, methods, and devices of the various embodiments may enable scalability in live streaming and/or on-demand presentations.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
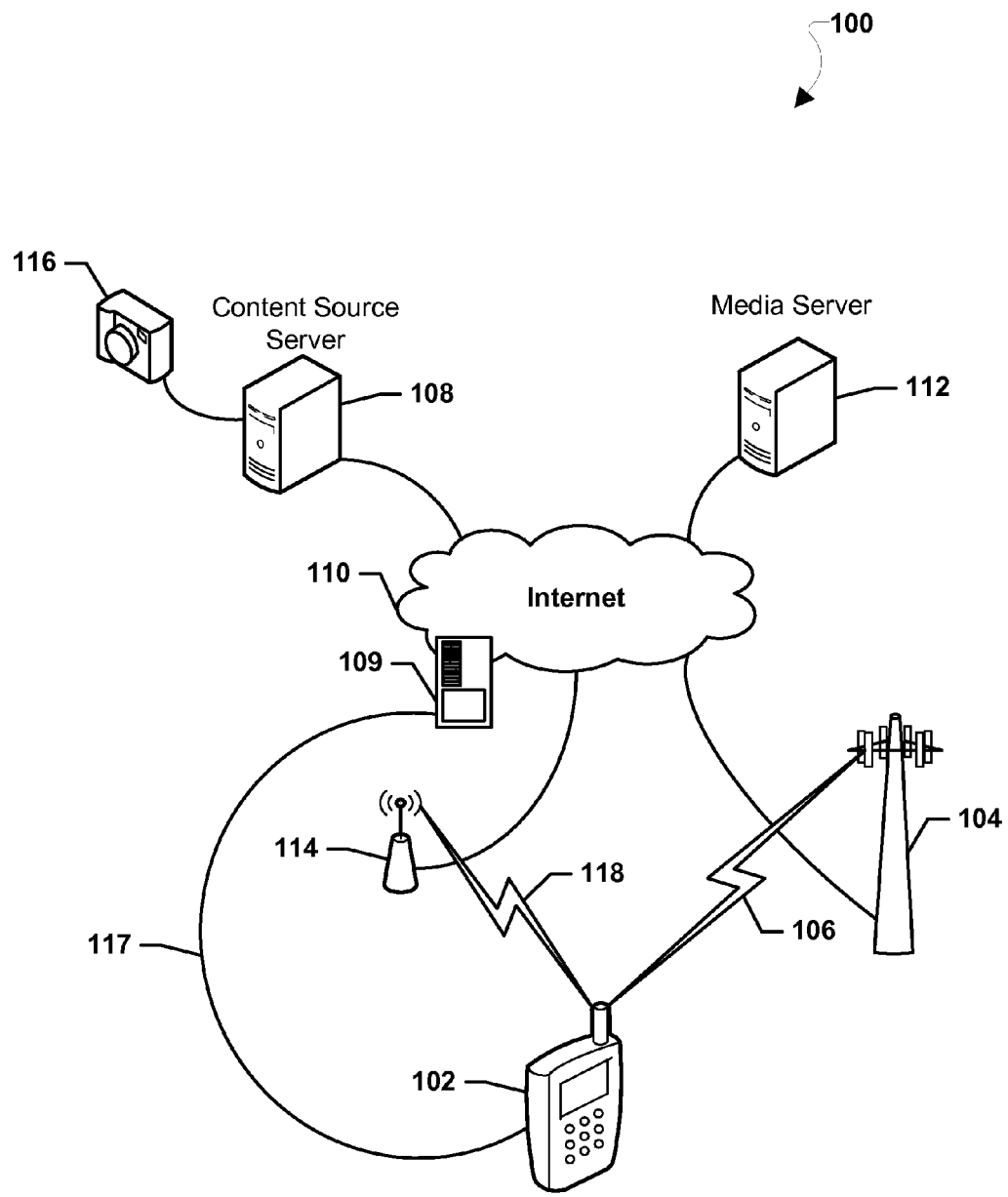
FIG. 1 is a communication system block diagram of a communication network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for presenting media content.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on mobile devices. A light server or secondary server may be a slimmed-down version of server type functionality that can be implemented on a mobile device thereby enabling it to function as an Internet server (e.g., an enterprise e-mail server) only to the extent necessary to provide the functionality described herein.

The systems, methods, and devices of the various embodiments enable scalability to be incorporated into a media presentation such that the media presentation at a client end may be continuous or at least substantially continuous in the presence of missing segment files. In an embodiment, the loss of one or more segment file may not require a media presentation interval associated with the missing segment file to be skipped at the client end. The systems, methods, and devices of the various embodiments may enable scalability in live streaming and/or on-demand presentations. Additionally, the various embodiments may provide resilience in a DASH streaming framework.

The various embodiments may solve problems with the current DASH streaming standard by enabling scalability to be incorporated into the media presentation so that the media presentation at the client end is continuous or at least substantially continuous in the presence of missing segment files. In an embodiment, the loss of one or more segment files need not require that the media presentation interval associated with the missing segment-file be skipped. The various embodiments may be specifically useful for live streaming, but may be applicable to on-demand presentations as well.

In current DASH streaming and/or other adaptive HTTP frameworks (e.g., smooth-streaming, HTTP-live-streaming, etc.), two or more available representations of varying bandwidths may be made available to a client. The client may be enabled to choose the available representation with a specific bandwidth based on parameters known to the client. As an example, the client may select a representation of a specific bandwidth based on the client's perception of the available download bandwidth.

The various embodiments may provide resilience on a per-representation basis. In an embodiment, scalability may be incorporated into a media presentation interval by independently encoding each scalable segment in each representation such that each scalable segment may be decoded independently of other scalable segments for the media presentation interval. In an embodiment, the scalability scheme used to encode the scalable segments may be provided to the client. In an embodiment, the scalability scheme may comprise a set of rules for utilizing the scalable segments to reconstruct the media representation. In an embodiment, a client may detect a scalable segment is missing and reconstruct a missing scalable segment by using the scalability scheme to extrapolate the missing data from a received scalable segment.

In an embodiment, the scalability scheme used to generate the scalable segments and/or other information necessary to reconstruct a media presentation interval from the scalable segments may be signaled to a client. Using the scalability scheme indication and/or the other information the client may reconstruct the media presentation from the scalable segments. In an embodiment, the scalability scheme and/or other information may be signaled in a playlist file (e.g., a DASH Media Presentation Description ("MPD")). In an embodiment, a rule may indicate the scalability scheme that was used by the content source to construct the scalable segments. In an embodiment, a client may be enabled to infer from the rule how to construct complete access units and thus, the complete media segment composed of the scalable segments. In an embodiment, a rule may assist the client in reconstructing a media segment from scalable segments that were not lost in transmission. As an example, a picture may be divided into x*y blocks, and if x=y=1 the pixels may be numbered such that the top left pixel is (0,0), the top right pixel is (0,C−1), the bottom left pixel is (R−1, 0), and the bottom right pixel is (R−1, C−1). In various embodiments, scalability may be achieved spatially. In an embodiment, a series of scalable segments may be constructed from sub-images of interleaving (e.g., checker boarding) across x*y blocks according to a rule. A spatial separation scheme may be applied to a media segment interval to create two or more scalable segments including different frames which may be superimposed on each other to recreate the original image. Recombining the two or more scalable segments at the client may result in playback of the original media segment, while playback of less than all the scalable segments may result in presentation of lower resolution images. As an example, a first rule may be identified as a spatial rule "1×2" which may generate 2 spatially checker boarded scalable segments each one half the resolution of the original image. According to the "1×2" rule one scalable segment may comprise the pictures associated with all the horizontal rows and all even numbered vertical rows, and the other scalable segment may comprise the pictures associated with all the horizontal rows and all odd numbered vertical columns As another example, a second rule may be identified as a spatial rule "2×1" which may generate two spatially checker boarded scalable segments each one half the resolution of the original image. According to the "2×1" rule one scalable segment may comprises the pictures associated with all the vertical columns and all the even numbered horizontal rows and the other scalable segment may comprise the pictures associated with all the vertical columns and all the odd numbered horizontal rows. As a further example, a third rule may be identified as a spatial rule "2×2" which may split the original image using a checker boarding scheme into four pictures each one quarter of the resolution of the original. According to the "2×2" rule one scalable segment may be associated with the pixels 4*i, 4*j, one scalable segment may be associated with the pixels 4*i,4*j+1, one scalable segment may be associated with the pixels 4*i+1, 4*j, and one scalable segment may be associated with the pixels 4*i+1, 4*j+1.

Various embodiments of different separation schemes/rules are discussed herein, specifically spatial separation schemes/rules. The discussions of spatial separation schemes/rules are provided merely as examples to better illustrate the aspects of the various embodiments, and are not intended to limit the various embodiments in any way. Other separation schemes/rules may be used with the various embodiments, and other separation schemes/rules may be substituted in the various examples without departing from the sprit or scope of the invention. As an example, scalability may be achieved temporally. A temporal separation scheme or a temporal separation rule may be applied to the media segment interval to create two or more scalable segments including different portions of the media segment, such as different frames of the media segment. In this manner, two or more scalable segments with lower frame rates than the original media segment may be created. Recombining the two or more scalable segments at the client may result in playback of the original media segment, while playback of less than all the scalable segments may result in a lower frame rate presentation. While different separation schemes/rules are discussed, the invention is not to be restricted by the scheme/rule used.

In an embodiment, separation schemes may be applied on a per-segment basis. In an embodiment in which separation schemes are applied on a per-segment basis, a playlist file indicate the separation scheme used for each segment may indicate the scalable segments associated created for each segment as well as the separation scheme used. In another embodiment, separation schemes may be applied on a per-representation basis. In an embodiment in which separation schemes are applied on a per-representation basis, all segments in a first representation may be separated into scalable segments using a first separation scheme and all segments in a second representation may be separated into scalable segments using a second separation scheme. In such an embodiment, the playlist file may indicate the separation scheme used for each representation. In an embodiment, a separation scheme may be applied on a per-adaptation set basis. In an embodiment in which separation schemes are applied on a per-adaptation set basis, all segments in all representations may be separated using the same separation scheme. In such an embodiment, the playlist file may indicate the overall separation scheme for the entire media adaptation without necessarily specifying the separation scheme for each individual representation.

In a further embodiment, scalable segments for a media segment may be transported in different segment files. In another embodiment, scalable segments for different media segments may be interleaved in different segment files for transmission. The separation of scalable segments may enable resilience in media playout on the client end despite network unreliability in transport of segment files.

The following description illustrates an example method for apply scalability and increasing resilience according to one embodiment. As an example, consider a part of a media presentation containing video with a presentation duration of 1000 s (1000 seconds) and a frame rate of 30 fps (frames per second) with $D_i$=10 s (for all i, 1<=i<=100), where $D_i$ is the duration associated with the interval $T_i$. The media presentation may be a concatenation of intervals $T_i$ (i=1, 2, . . . , 100). That is, $T_1$, $T_2$, $T_3$, . . . , $T_{100}$ may constitute the part of media presentation being illustrated.

Setting $N_i$=2 for all i (1<=i<=100), each media presentation interval $T_i$ may be associated with 2 scalable segments of each media segment of interval $T_i$ identified as $S_{i,1}$ and $S_{i,2}$. If there are 100 segment files $F_j$ (1<=j<=100) associated with these intervals, segment file $F_{2r-1}$ may be associated with scalable segments in $S_{2r-1,1}$ and $S_{2r}$, 1, 1<=r<=50, and segment file $F_{2r}$ may also be associated with a scalable segments in $S_{2r-1,2}$, $S_{2r,2}$, 1<=2<=50.

Scalable segment $S_{i,1}$ may contain access units at 15 fps with the relative offsets of the first access unit from the start of $T_i$ as zero, and scalable segment $S_{i,2}$ may contain access units at 15 fps with the relative offsets of the first access unit from the start of $T_i$ of 33 ms.

In this example, the segment file $F_{2r-1}$ may contain access units with timestamps of approximately 0 ms, 66 ms, . . . , 19933 ms relative to the start of $T_{2r-1}$. The segment file $F_{2r}$ will contain access units with timestamps of approximately 33 ms, 100 ms, . . . , 19966 ms relative to the start of $T_{2r-1}$.

Thus, if both the scalable segments $S_{2r-1}$ and $S_{2r}$ are received by the client, then the intervals $T_{2r-1}$ and $T_{2r}$ may be played out at 30 fps. If exactly one of the scalable segments $S_{2r-1}$ and $S_{2r}$ is lost, then the intervals $T_{2r-1}$ and $T_{2r}$ may be played out at 15 fps (that is lower quality than 30 fps), but the media presentation corresponding to $T_{2r-1}$ and $T_{2r}$ is not skipped at the client. Therefore, because the client received at least one of the scalable segments $S_{2r-1}$ and $S_{2r}$ the media presentation may be reconstructed and rendered at the client with a defined quality threshold using only that received scalable segment.

As another example, suppose segment file $F_{2r}$ is missing. Then, the media presentation associated with $T_{2r-1}$ and $T_{2r}$ can be recovered from $F_{2r-1}$ at 15 fps with access units of timestamps of 0 ms, 66 ms, . . . , 19933 ms relative to the start of $T_{2r-1}$. If instead a segment file $F_{2r-1}$ is missing, then the media presentation associated with $T_{2r-1}$ and $T_{2r}$ may still be playable using $F_{2r}$ with access units of timestamps 66 ms, 100 ms, . . . , 19966 ms and so on relative to the start of $T_{2r-1}$ FIG. 1 illustrates a communication network system 100 suitable for use with the various embodiments. The communication network system 100 may include multiple devices, such as a receiver device 102, one or more cellular towers or base stations 104, one or more wireless access point 114, one or more routers 109, and servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router which may connect to the Internet 110. The receiver device 102 may exchange data via one or more connections 118, including Wi-Fi® or any other type connection, with the wireless access point 114. The wireless access point 114 may be in communication with a router which may connect to the Internet 110. The receiver device 102 may exchange data via one or more wired connections 117 with the router 109 which may connect to the Internet 110. In this manner, via the connections to the cellular tower or base station 104, wireless access point 114, router 109, and/or Internet 110, data may be exchanged between the receiver device 102 and the server(s) 108 and 112. In an embodiment, the server 108 may be a content source server, which may encode scalable media segments. In an embodiment, the content source server 108 may receive media from a media capture device 116, such as a camera, may encode the received media into scalable media segments, and may send the scalable segments in segment files to the server 112. In an embodiment, server 112 may be a media server (e.g., a DASH server), which may receive the scalable segments from the content source server 108 and may control the provisioning of the scalable segments to the receiver device 102.

Figure 2A:
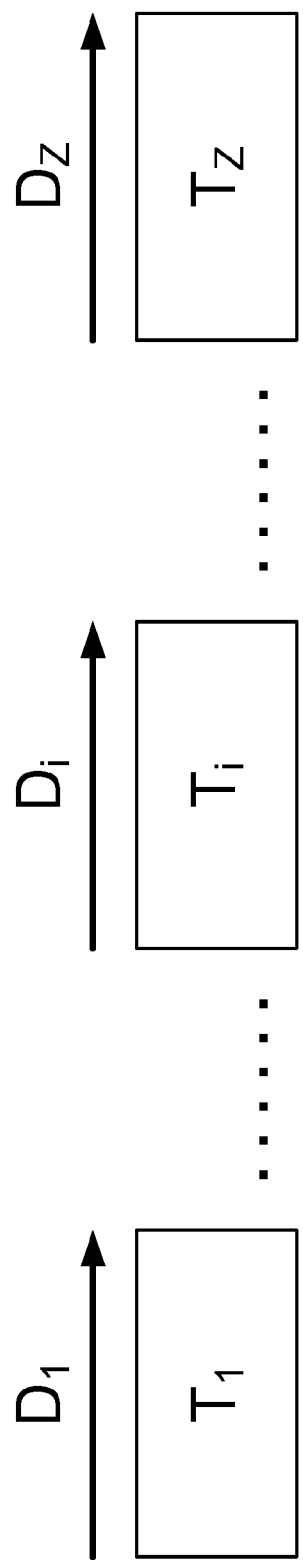
FIG. 2A illustrates an example prior art media presentation.

FIG. 2A illustrates an example prior art media presentation in which a concatenation of media segments of an interval $T_i$ such that $T_i$ ($1 \leq i \leq Z$, where i equals the interval number) constitutes the entire media presentation. Z may be infinite in a case where the media presentation is a live stream. $D_i$ may be the duration of the media presentation interval $T_i$. A segment file may contain data associated with one or more media presentation intervals. Per the current DASH standard one or more media segments may be present in a segment file, but the media presentation interval mapped by one segment file do not overlap the media presentation interval associated with another segment file. In the current DASH standard the time intervals mapped by different segment files are mutually exclusive. An OnDemand stream can have one single segment file to contain the entire media presentation. This may be acceptable in current Video OnDemand ("VOD") streams as the entire media presentation can be fetched if any segment in the media presentation can be fetched from the DASH server.

However, in live streaming, the entire media presentation may not typically be available at once. The DASH server providing the media presentation may receive segment files from the content source (e.g., a content source server) in or near real time as live media scenes are captured, encoded into segment files, and transmitted from the content source server to the server providing the media presentation (e.g., the DASH server). In prior art system each interval $T_i$ may be encoded into a single segment file as illustrated in FIG. 2B.

Figure 2B:
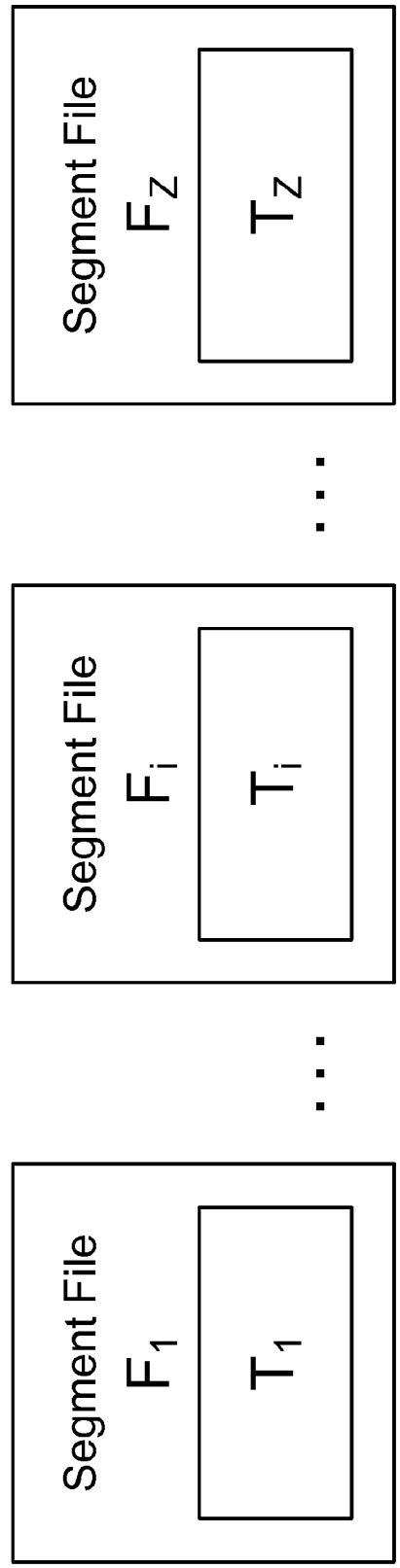
FIG. 2B illustrates an example prior art segment file assignment scheme.

In prior art systems, if a segment file, such as $F_i$ (where i equals the segment file number) illustrated in FIG. 2B, is lost or missing then all media segments contained in the segment file $F_i$ are lost. The entire media presentation interval corresponding to $F_i$ would need to be skipped by the client. To decrease the bounds of the media presentation interval that is lost due to a missing segment file, each segment file may contain exactly one media segment. However, the mapping of one media segment to one segment file does not address the fact that in prior art systems an interval of the media presentation will need to be skipped in the presence of even a single missing segment file.

The systems, methods, and devices of the various embodiments incorporate scalability into a media presentation. In an embodiment, scalability may be incorporated such that the media presentation at a client end may be continuous or at least substantially continuous in the presence of missing segment files. In an embodiment, the scheme used to incorporate scalability may be signaled to client. Incorporating scalability according to the various embodiments may improve resilience in media presentations.

Figure 3:
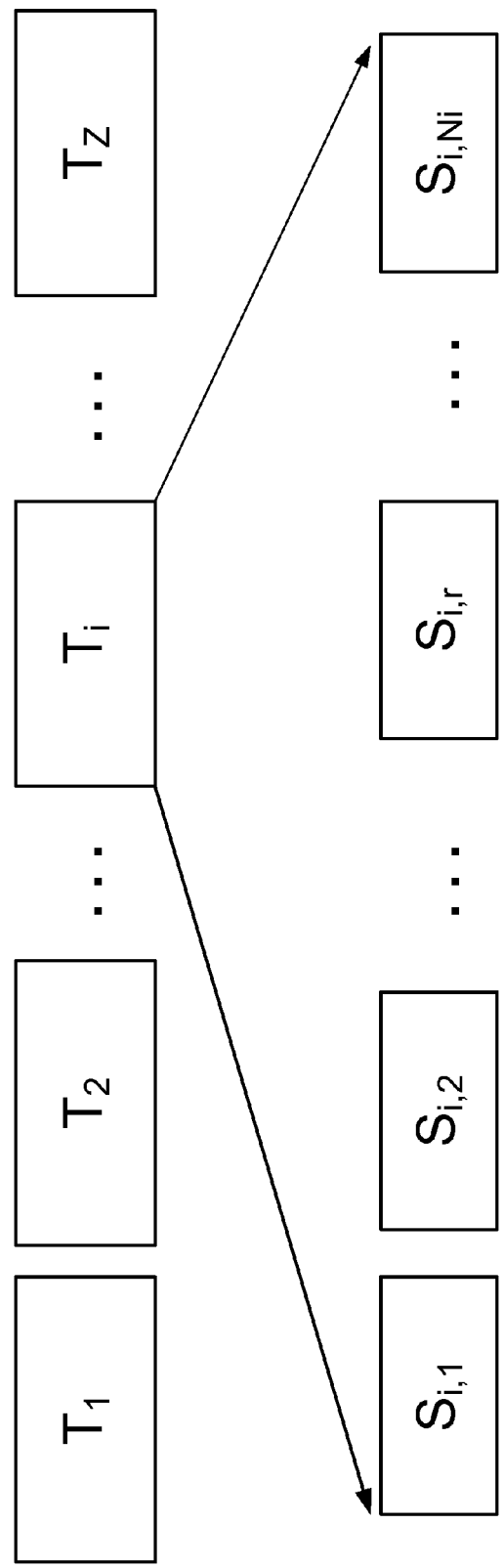
FIG. 3 illustrates a media segment separated into scalable segments according to an embodiment.

FIG. 3 illustrates a media segment of an interval $T_i$ separated into scalable segments $S_{i,1}$ to $S_{i,Ni}$ according to an embodiment. In an embodiment, the media presentation interval $T_i$ may be separated into Ni (where Ni>1 and Ni is a positive integer) independently decodable scalable segments $S_{i,w}$ (where $1 \leq w \leq Ni$). In an embodiment, a scalable segment of an interval $T_i$ may be a collection of data such that the combination of 'v' ($1 \leq v < Ni$) scalable segments is sufficient to play out the media presentation corresponding to media presentation interval $T_i$. In an embodiment, the value of 'v' and the subset of the 'v' scalable segments of $T_i$ that are necessary at a minimum to construct the media presentation interval may depend on the scalability scheme applied on interval $T_i$. In an embodiment, the value of 'v' and the subset of the 'v' scalable segments of $T_i$ that are necessary at a minimum to construct the media presentation interval may be selected such that the media segment may be rendered at defined quality threshold. As an example, a defined quality threshold may be a quality level at which a media segment may be rendered without resulting in a user perceptible quality degradation, such as a stall during playback by the client. As another example, a defined quality threshold may be a quality level such that a hypothetical representation of bandwidth when rendering a scalable segment is above the bandwidth of an available next lower quality representation of the segment. For example, if a 2 Mbps representation and a 750 kbps representation of the media segment are available, the defined quality threshold for the scalable segments of the 2 Mbps may be set to 1000 kbps. Thus, receiving at least one of scalable segments for the 2 Mbps representation may enable a higher quality playout than receiving the full segment for the lower quality 750 kbps representation. As a further example, the defined quality threshold may be based at least in part on a probability of a burst file loss in sending the two or more scalable segments to the receiver device.

Figure 4:
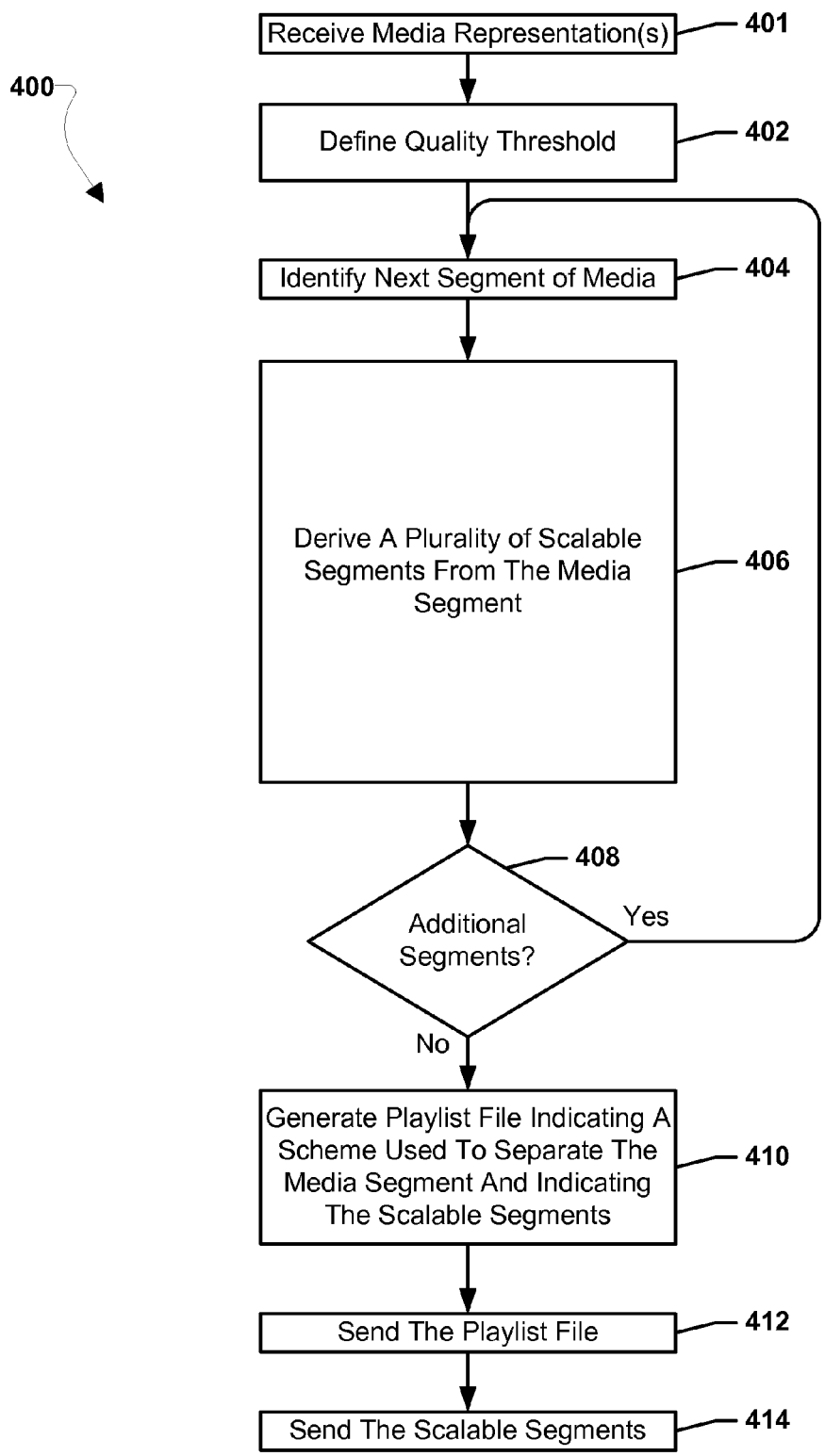
FIG. 4 is a process flow diagram illustrating an embodiment method for separating a media segment into two or more scalable segments.

FIG. 4 illustrates an embodiment method 400 for deriving two or more scalable segments from a media segment. In an embodiment, the operations of method 400 may be performed by at least one server, for instance, the content source server 108 (FIG. 1), the media server 112 (FIG. 1), one or more other servers, or a combination thereof. In block 401 the content source server 108 may receive one or more media representations for a content stream. In an embodiment, the one or more media representation may be received from an encoder creating media representations of a content stream captured by a media capture device, such as a camera. As an example, a camera may capture a stream as a sequence of pictures across media presentation intervals $T_i$ at 1920×1080 pixels and an encoder may generate encodings of the stream at media representations suited for a bandwidth of 750 Mbps bandwidth and a bandwidth of 1500 Mbps. The representations may each be provided to the content source server 108 for deriving scalable segments.

In block 402 the content source server 108 may define a quality threshold. In an embodiment, the quality threshold may be a value corresponding to an acceptable quality level for rendering of a segment by a client application (e.g., a DASH enabled video player). As an example, the quality threshold may be defined such that a media segment meeting the quality threshold may be rendered without a user perceptible quality degradation (e.g., a stall during playback by the client application on a receiver device outputting the media segment). Of course, in other embodiments, the quality threshold may be defined such that a media segment meeting the quality threshold may be rendered with a user perceptible quality degregation, which (while not ideal) may still be preferable over no rendering of the media segment. In block 404 the content source server 108 may identify the next media segment (e.g., next media presentation interval $T_i$) in the received media representation.

In block 406 the content source server 108 may derive, from the media segment, a plurality of scalable segments. Desirably, a proper subset of the scalable segments derived from the media segment in block 406 may include an amount of data sufficient to enable a client on a receiver device to render the media segment at or above the quality threshold using only the proper subset (i.e., without using all of the scalable segments derived in block 406). In one example, each scalable segment derived in block 406 may include an amount of data sufficient to enable a client on a receiver device to render the media segment at or above the quality threshold using only that scalable segment (i.e., without using any of the other scalable segments derived in block 406). In another example, the proper subset of the scalable segments derived in block 406 may include multiple scalable segments that collectively include an amount of data to enable a client on a receiver device to render the media segment at or above the quality threshold using only the proper subset (i.e., without using all of the scalable segments derived in block 406).

In one embodiment, in block 406, the content source server 108 may, to derive the scalable segments from the media, separate the media segment into the scalable segments. As an example, a media segment interval $T_i$ of the representation may be separated into a series of independent scalable segments. Each picture $P_{i,k}$ ($1 \leq k \leq K$) in interval $T_i$ may be decomposed into 'U' smaller pictures (e.g., sub-images) $P_{i,k,u}$ ($1 \leq u \leq U$). If U=4, then four independent sub-images may be encoded without any dependency on each other, and the interval $T_i$ may be separated into four independent scalable segments constituting four sequences of sub images $P_{i,k,1}$, $P_{i,k,2}$, $P_{i,k,3}$, $P_{i,k,4}$ ($1 \leq k \leq K$). In this manner, the scalable segments may be created from four independent processes and each scalable segment may be independent from the others. As illustrated by this example, in an embodiment, as long as any one scalable segment is received by the client, though the other scalable segments may be lost, a version of the media segment for that interval may be played out by the client because each scalable segment is independent of each other. This solution is superior to (and differs from) encoding schemes in which a higher layer in hierarchy (such as an enhanced layer) and a lower layer upon which the higher level depends (such as a base layer) are coded separately because, in those encoding schemes, the higher layer will not be useful if the lower layer is lost.

The plurality of scalable segments derived in block 406 may be overlap temporally. For example, in one embodiment, the temporally-overlapping scalable segments may include frames that overlap over the time span of the media segment interval $T_i$ of the representation (e.g., where the media segment corresponds to N number of frames at a higher resolution and where each scalable segment corresponds to N/Ni (where Ni is the number of scalable segments in the media segment interval $T_i$) number of frames having a lower resolution). Also, for example, in one embodiment, the temporally-overlapping scalable segments may include frames that are intermingled over the time span of the media segment interval $T_i$ of the representation (e.g., where the media segment includes N number of frames and Ni=2, a first temporally-overlapping scalable segment corresponds to first set of N/2 frames, a second temporally-overlapping scalable segment corresponds a different second set of N/2 frames that repeatedly alternates with the first set of N/2 frames over the time span of the media segment interval $T_i$).

In determination block 408, the content source server 108 may determine whether additional segments in the media representation(s) remain. If additional segments remain (i.e., determination block 408="Yes"), as discussed above the content source server 108 may, in block 404, identify the next segment of the media representation, and in block 406, the content source server 108 may derive a plurality of scalable segments from the media segment. In an embodiment, in which separation schemes are applied on a per-segment basis via blocks 404, 406 and 408, the same separation scheme and rule may be applied to the next segment as was applied to the previous segment to create scalable segments or a different separation scheme may be applied to create scalable segments. In embodiments in which separations schemes are applied on a per-representation or per-adaptation basis via blocks 404, 406 and 408, the same separation scheme and rule may be applied to the next segment as was applied to the previous segment. In determination block 408, the content source server 108 may again determine whether additional segments in the media representation(s) remain to be separated into scalable segments. In this manner, some or all segments for the received media representation(s) may be separated into scalable segments.

If no additional media segments in the media representation(s) remain (i.e., determination block 408="No"), the content source server 108 may generate a playlist file indicating at least one scheme used to derive the scalable segments and indicating the scalable segments. For example, in block 410 the content source server 108 may generate a playlist file indicating a scheme or schemes used to separate the media segments and indicating the scalable segments. In an embodiment, a playlist file (e.g., a MPD), may indicate the separation scheme used to create each scalable segment and indicate each scalable segment. An example portion of a schema for such a playlist file is shown below.

Segment Level
Segment-1-*.3gp;Rule:2×2,Name:a,b,c,d
Segment-2-*.3gp;Rule: 1×2,Name:a,b Thus, in this example, the scalable segments associated with segment 1 and created using rule "2×2" may be "Segment-1-a.3gp", "Segment-1-b.3gp", "Segment-1-c.3gp", and "Segment-1-d.3gp" and the scalable segments associated with segment 2 and created using rule "1×2" may be "Segment-2-a.3gp" and "Segment-2-b.3gp." The indication of the separation scheme used to create each scalable segment and indication of each scalable segment may be useful in embodiments in which separation schemes are applied on a per-segment basis.

In another embodiment, a playlist file (e.g., a MPD), may indicate the separation scheme for all scalable segments and indicate each scalable segment. An example portion of a schema for such a playlist file is shown below.

Representation:
Rule:2×2,Name:a,b,c,d
Segment Level
Segment-1-*.3gp
Segment-2-*.3gp Thus, in this example, the scalable segments associated with all segments in the representation are created using the same rule "2×2" and result in the same number of scalable segments (e.g., four). Thus, segment 1 may have scalable segments "Segment-1-a.3gp", "Segment-1-b 0.3gp", "Segment-1-c.3gp", and "Segment-1-d.3gp" and segment 2 may have scalable segments "Segment-2-a.3gp" "Segment-2-b.3gp", "Segment-2-c.3gp", and "Segment-2-d.3gp." The indication of the separation scheme used for the overall representation and indication of each scalable segment may be useful in embodiments in which separation schemes are applied on a per-representation basis.

In a further embodiment, a playlist file (e.g., a MPD), may indicate the separation scheme for all representations and indicate each scalable segment. An example portion of a schema for such a playlist file is shown below.

Adaptation Set Level:
Rule:2×2,Name:a,b,c,d

Thus, in this example, the scalable segments associated with all segments in any representation for the adaptation are created using the same rule "2×2" and result in the same number of scalable segments (e.g., four). The indication of the separation scheme used for the adaptation and indication of each scalable segment may be useful in embodiments in which separation schemes are applied on a per-adaptation basis.

In block 412 the content source server 108 may send the playlist file. In an embodiment, the playlist file may be sent to a client (e.g., a DASH enabled media player) operating on receiver device. As an example, the playlist file may be sent to a client operating on a receiver device by the content source server 108 sending the playlist file to the media server 112, the client requesting (e.g., fetch) the playlist from the media server 112 (e.g., via an HTTP Get( )), and the client receiving the playlist file from the media server 112. As another example, the playlist file may be hosted by the content source server 108 and sent directly to the client operating on the receiver device from the content source server 108 in response to a request from the client. As yet another example, the playlist file may be broadcast to the client operating on the receiver device (e.g., broadcast by the media server 112 after receiving the playlist file from the content source server 108). In an embodiment in which the media representations are for live streaming, the playlist file may be dynamically generated and updated and sent. In block 414 the content source server 108 may send the scalable segments. In an embodiment, the scalable segments may be sent to a client (e.g., a DASH enabled media player) operating on a receiver device. As an example, the scalable segments may be sent to a client operating on a receiver device by the content source server 108 sending the scalable segments to the media server 112, the client requesting (e.g., fetch) the scalable segments from the media server 112 (e.g., via an HTTP Get( )), and the client receiving the one or more scalable segments from the media server 112. As another example, the scalable segments may be hosted by the content source server 108 and sent directly to the client operating on the receiver device from the content source server 108 in response to a request from the client. As yet another example, the content source server 108 may broadcast the scalable segments to the media server 112 (which may be remote from the receiver device or may be a local media server included in the receiver device), and the client may then request the scalable segments from the media server 112. In still another example, the media server 112, after receiving the scalable segments from the content source server 108, or the content source server 108 may broadcast the scalable segments to the receiver device.

As discussed above, a playlist may be generated that indicates at least one scheme used to derive the scalable segments. The playlist, which indicates at least one scheme used to derive the scalable segments, may be generated before the scalable segments are derived, after the scalable segments are derived, or while the scalable segments are being derived. In addition, the playlist may be updated one or more times, if desired.

Figure 5:
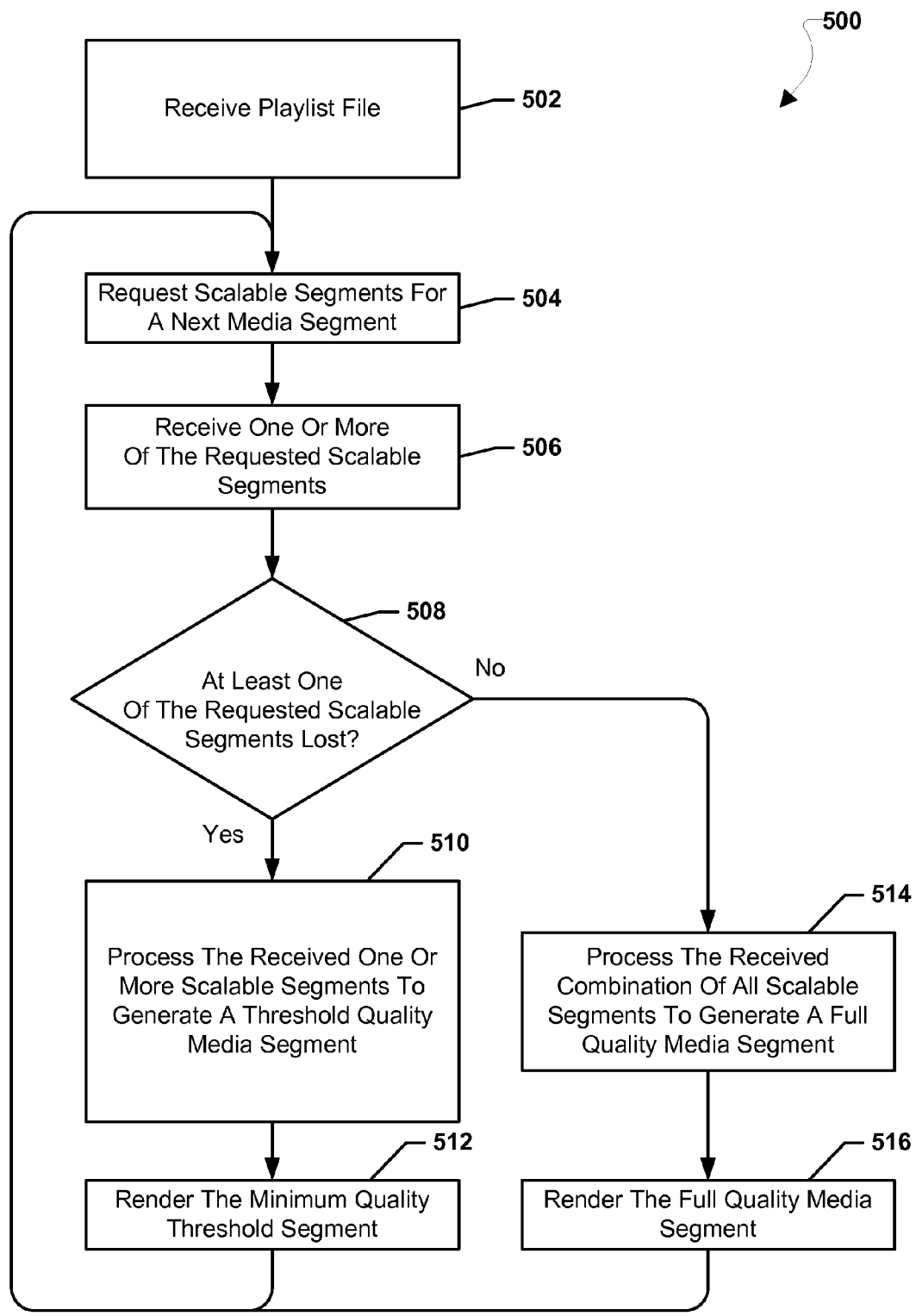
FIG. 5 is a process flow diagram illustrating an embodiment method for presenting media using scalable segments.

FIG. 5 illustrates an embodiment method 500 for presenting media using scalable segments. In an embodiment, the operations of method 500 may be performed by a client application (e.g., a DASH enabled media player) operating on a processor of a receiver device.

In block 502 the client may receive a playlist file. For example, in block 502 the client may receive a playlist file including an indication of a scheme used to derive scalable segments from a media segment, such as, a playlist file including an indication of a scheme used to separate media segments into scalable segments. In an embodiment, the playlist file (e.g., an MPD) may include an indication of one or more separation schemes and/or rules used to generate scalable segments for a media segment. In an embodiment, a client may receive the playlist file in response to a request for the playlist file sent to the media server 112 and/or the content source server 108, which may be hosting the playlist file. In another embodiment, the client may receive the playlist file via a broadcast from the media server 112, the content source server 108, or another server.

In block 504 the client may request some or all of the scalable segments for a next media segment, which scalable segments may have been derived from the media segment as discussed above with reference to block 406 (FIG. 4). In an embodiment, the client may request the scalable segments for a next media segment by fetching the scalable segments from the media server 112 and/or the content server 108 that may be hosting the scalable segments corresponding to a next media segment (e.g., sending an HTTP Get( ) requesting the scalable segments). As an example, the client may identify the next media segment to request based on segment timeline information included in a playlist file that was received at block 502. Additionally, the client may make a decision on which representation to request (e.g., based on available bandwidth and/or other parameters) and may request only scalable segments for a specific selected representation. The client, however, need not request the scalable segments and may, for example, receive the scalable segments via broadcast (e.g., broadcast by the content source server 108 directly or broadcast by the media server 112 after receiving the scalable segments from the content source server 108).

In block 506 the client may receive one or more of the scalable segments that were requested in block 504. Based on various factors, such as missing segments at the hosting server, transmission interference, transport connection losses, burst losses, etc., in some cases, all scalable segments requested in block 504 may not be received by the client. In other cases, all scalable segments requested in block 504 may be received. While it is possible that the client will not receive all the requested scalable segments because of a problem in the transport between the hosting server and the client, it is more likely that, if the client does not receive all the requested scalable segments, it is because the hosting server (e.g., the media server 112) has not received all of the requested scalable segments from a source server (e.g., the content source server 108), for example, because one or more files including the requested scalable segments were dropped by an unreliable network link.

In determination block 508 the client may determine whether at least one of the scalable segments, which were requested in block 504, was lost. As an example, the client may treat error responses for a request for any individual scalable segment request (e.g., HTTP 404 error codes) as an indication that at least one other scalable segment for the media segment was lost. As another example, the client may compare the received scalable segments to a list of all scalable segments for the media segment to identify whether at least one other scalable segment for the media segment was lost.

If no scalable segments are lost (i.e., determination block 508="No"), in block 514 the client may process the received combination of all scalable segments, which were received in block 506, to generate a full quality media segment. As an example, the client may combine the received scalable segments to reconstruct the full quality media segment from which the received scalable segments were derived. A smoothing step may be applied as part of the processing. In an embodiment, to assist in reconstructing the full quality media segment, the client may use a derivation scheme (such as a separation scheme) indicated in the playlist file received in block 502 to generate the full quality media segment. In block 516 the client may render the full quality media segment. As an example, the client may output the content (e.g., video and/or audio) for the media segment on a user interface (e.g., display, speakers, etc.) of the receiver device. The client may then return to block 504.

If at least one scalable segment, which was requested for the media segment in block 504, is lost (i.e., determination block 508="Yes"), in block 510 the client may still advantageously process the one or more requested scalable segments that were received in block 506 to generate a threshold quality media segment. The threshold quality media segment may be at or above a defined quality threshold, such as the quality threshold defined in block 402 (FIG. 4). In one embodiment, in block 510, the client may process the one or more requested scalable segments based at least in part on a derivation scheme indicated in the playlist file received in block 502 (for instance an indicated separation scheme in the playlist file) to generate the threshold quality media segment.

In further detail, as mentioned above, a proper subset of the scalable segments derived from the media segment in block 406 (FIG. 4) may include an amount of data sufficient to enable a client on a receiver device to render the media segment at or above the quality threshold using only the proper subset (i.e., without using all of the scalable segments derived in block 406). In addition, as mentioned above, the proper subset of the scalable segments may consist of an individual scalable segment or may consist of a combination of scalable segments. Accordingly, if at least one requested scalable segment is lost (thus only a proper subset of the scalable segments is received at block 506 in FIG. 5), in block 510, that received proper subset of scalable segments may be duplicated and copies of the received proper subset of scalable segments may be used to replace the lost scalable segment(s). As another example, if at least one requested scalable segment is lost, in block 510, the client may construct the lost scalable segment(s) by extrapolation of the received proper subset of scalable segments. One way may be to perform averaging of the neighboring pixels associated with any scalable segment(s) that was/were received successfully. As another example, in block 510, the client may reconstruct pictures in one or more lost scalable segments by generating more than one candidate sub-image for each lost sub-image in the lost scalable segment(s) based on spatial information of the received proper subset of scalable segments, and then use a selection criteria, such as lowest peak signal to noise ration ("PSNR"), to select a candidate image with which to replace the lost scalable segment(s). Additionally, a smoothing step may be applied as part of the processing.

In block 512 the client may render the threshold quality threshold segment that was generated in block 510. As an example, the client may output the content (e.g., video and/or audio) for the threshold quality media segment on a user interface (e.g., display, speakers, etc.) of the receiver device. The client may then return to block 504.

Figure 6:
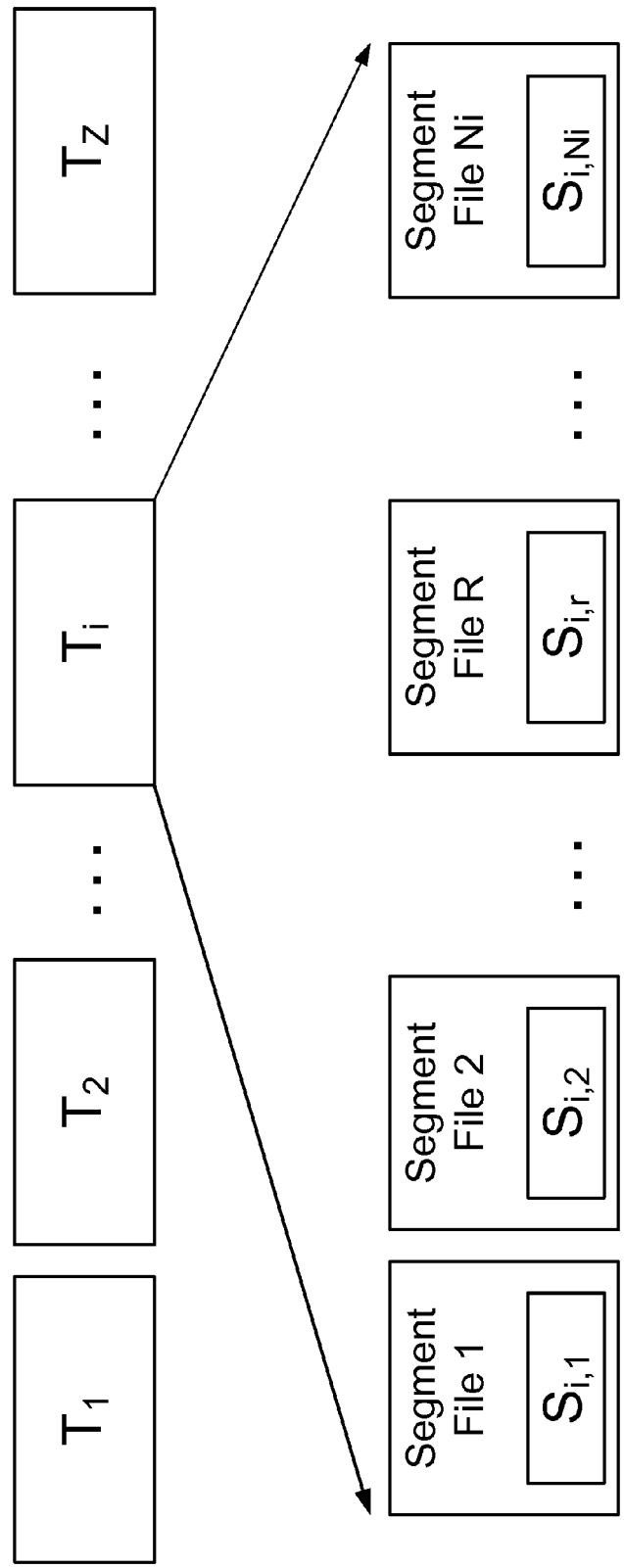
FIG. 6 illustrates a media segment separated into scalable segments and assigned to segment files according to an embodiment.

All scalable segments generated for a media segment need not be stored in the same segment file. FIG. 6 illustrates an embodiment transport scheme in which each scalable segment $S_{i,1}$ through $S_{i,Ni}$ generated from a media segment interval $T_i$ are stored in their own respective segment files, Segment File 1 through Segment File Ni. In this manner, the loss of one segment file may only result in the loss of one scalable segment. Additionally, a delay between transmission of each segment file may account for unreliability in network transmission.

Figure 7:
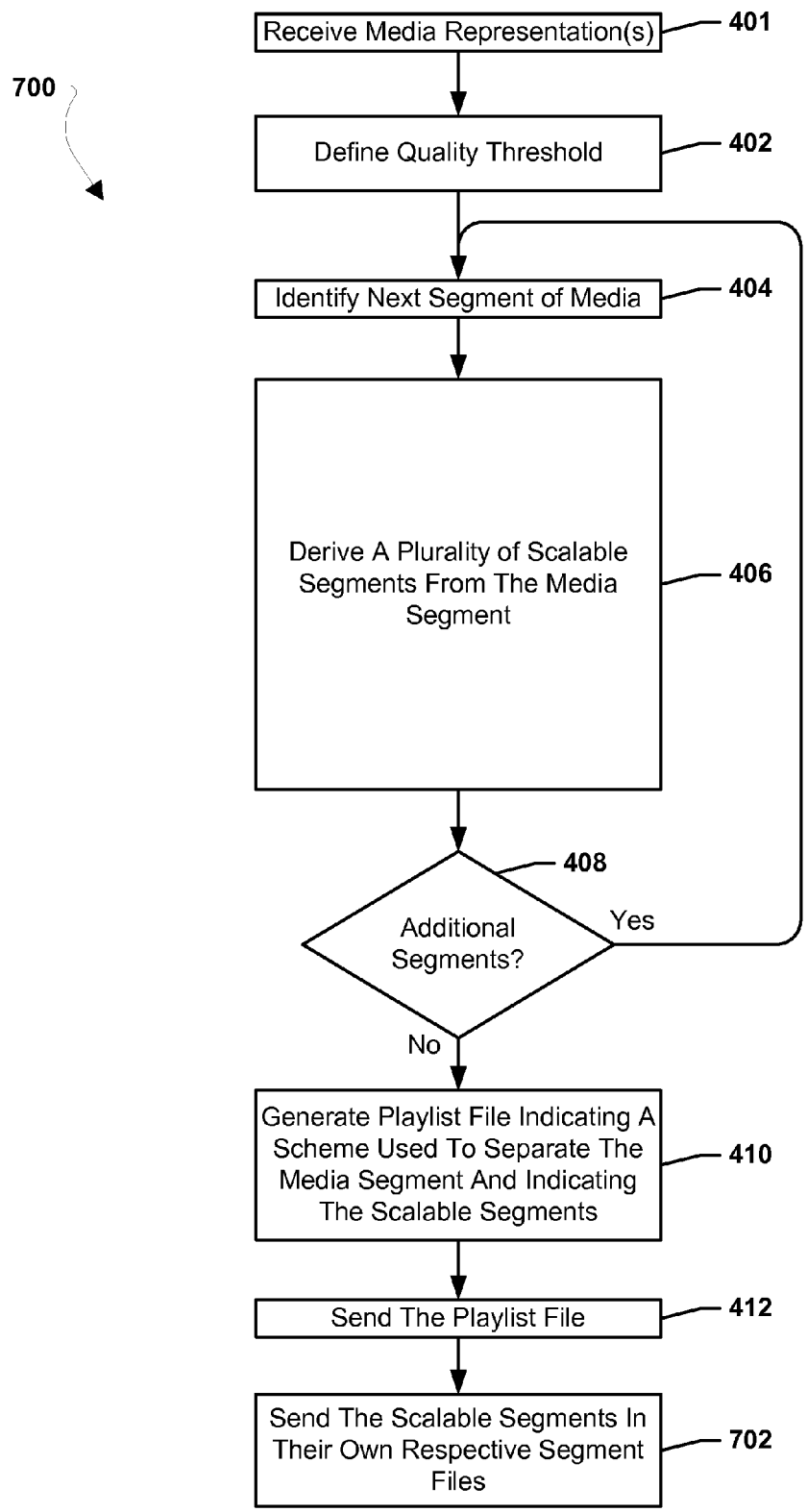
FIG. 7 is a process flow diagram illustrating another embodiment method for separating a media segment into two or more scalable segments.

FIG. 7 illustrates an embodiment method 700 for generating scalable segments similar to method 400 described above, except that in method 700 each scalable segment may be sent in different segment files. In an embodiment, the operations of method 700 may be performed by at least one server, for instance, the content source server 108 (FIG. 1), the media server 112 (FIG. 1), one or more other servers, or a combination thereof. In blocks 401, 402, 404, 406, 408, 410, and 412 at least one server may perform operations of like numbered blocks of method 400 described above with reference to FIG. 4 to generate scalable segments. In block 702 at least one server may send—using the various ways discussed with reference to block 414 above—the scalable segments in their own respective segment files.

Figure 8:
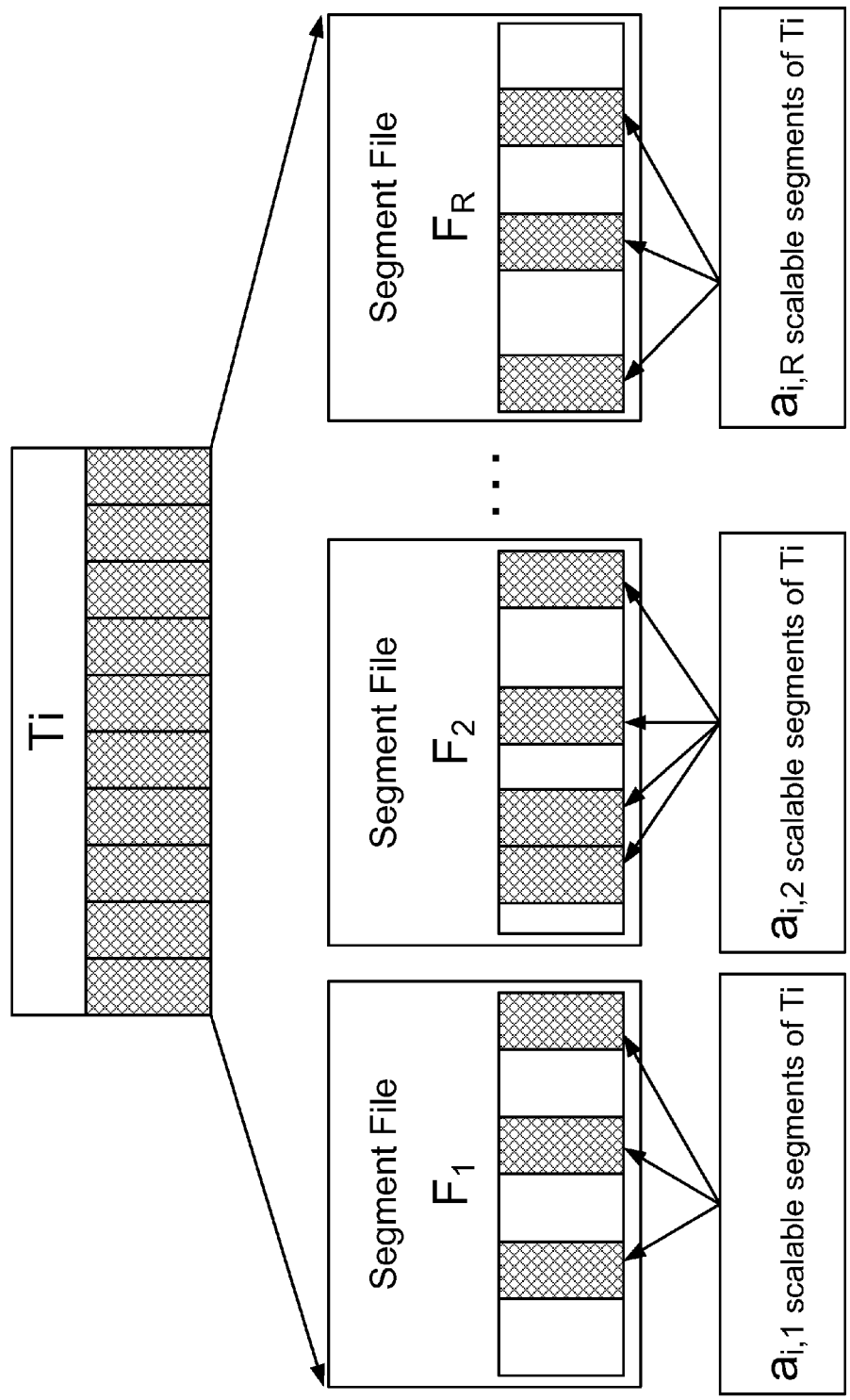
FIG. 8 illustrates a media segment separated into scalable segments and assigned to segment files carrying different scalable segments according to an embodiment.

In an embodiment, a segment file may include scalable segments corresponding to different media segments. In this manner, the loss of a segment file may result in the loss of the scalable segments of different media segments stored in that segment file. As all scalable segments may not be needed to play out the media segment interval, the loss of one or more segment files may not require the presentation of media corresponding to media segment interval to be skipped. FIG. 8 illustrates the scalable segments spread across R segment files. For example, $a_{i,j}$ ($1 \leq j \leq R$) may indicate the number of scalable segments of $T_i$ in $F_j$ ($1 \leq j \leq R$) so that $Ni = \sum_{j=1}^{R} a_{i,j}$. In an embodiment, the number of scalable segments $T_i$ that are dropped may be reduced by interleaving transmission of the segment files from the content source such that Ni scalable segments of an interval are further spread out across time. For example, the delay between the transmission of the segment files associated with the scalable segments $S_{i,w}$ and $S_{i,w+1}$ may be $Y_{i,w}$ ($1 \leq w \leq Ni-1$) and the total delay in transmission between $S_{i,1}$ and $S_{i,Ni}$ may be $\Sigma_{j=1}^{R} Y_{i,w}$. As long as the duration of consecutive network drops is less than $\Sigma_{j=1}^{R} Y_{i,w}$, it may be possible to still playout the media segment for interval $T_i$. This interleaving transmission scheme may be useful if the duration of network unreliability occurs in bursts but results in multiple segment files being dropped.

Figure 9:
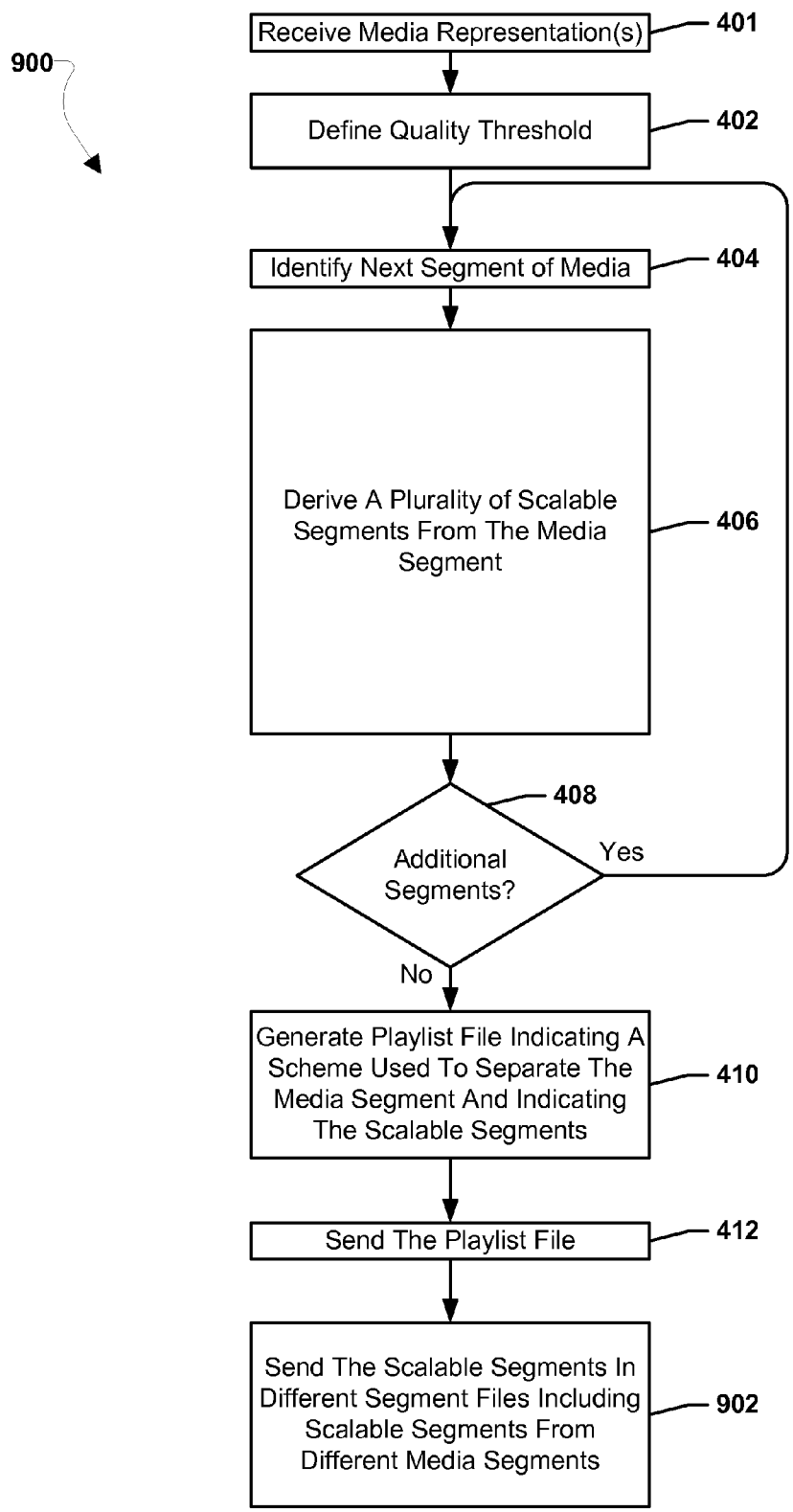
FIG. 9 is a process flow diagram illustrating a third embodiment method for separating a media segment into two or more scalable segments.

FIG. 9 illustrates an embodiment method 900 for generating scalable segments similar to method 400 described above, except that in method 900 each scalable segment may be sent in different segment files including scalable segments from different media segments. In an embodiment, the operations of method 900 may be performed by at least one server, for instance, the content source server 108 (FIG. 1), the media server 112 (FIG. 1), one or more other servers, or a combination thereof. In blocks 401, 402, 404, 406, 408, 410, and 412 at least one server may perform operations of like numbered blocks of method 400 described above with reference to FIG. 4 to generate scalable segments. In block 902 at least one server may send—using the various ways discussed with reference to block 414 above—the scalable segments in different segment files including scalable segments from different media segments. As an example, the scalable segments may be interleaved in different segment files. As another example, the scalable segments may be listed sequentially in different segment files.

Figure 10:
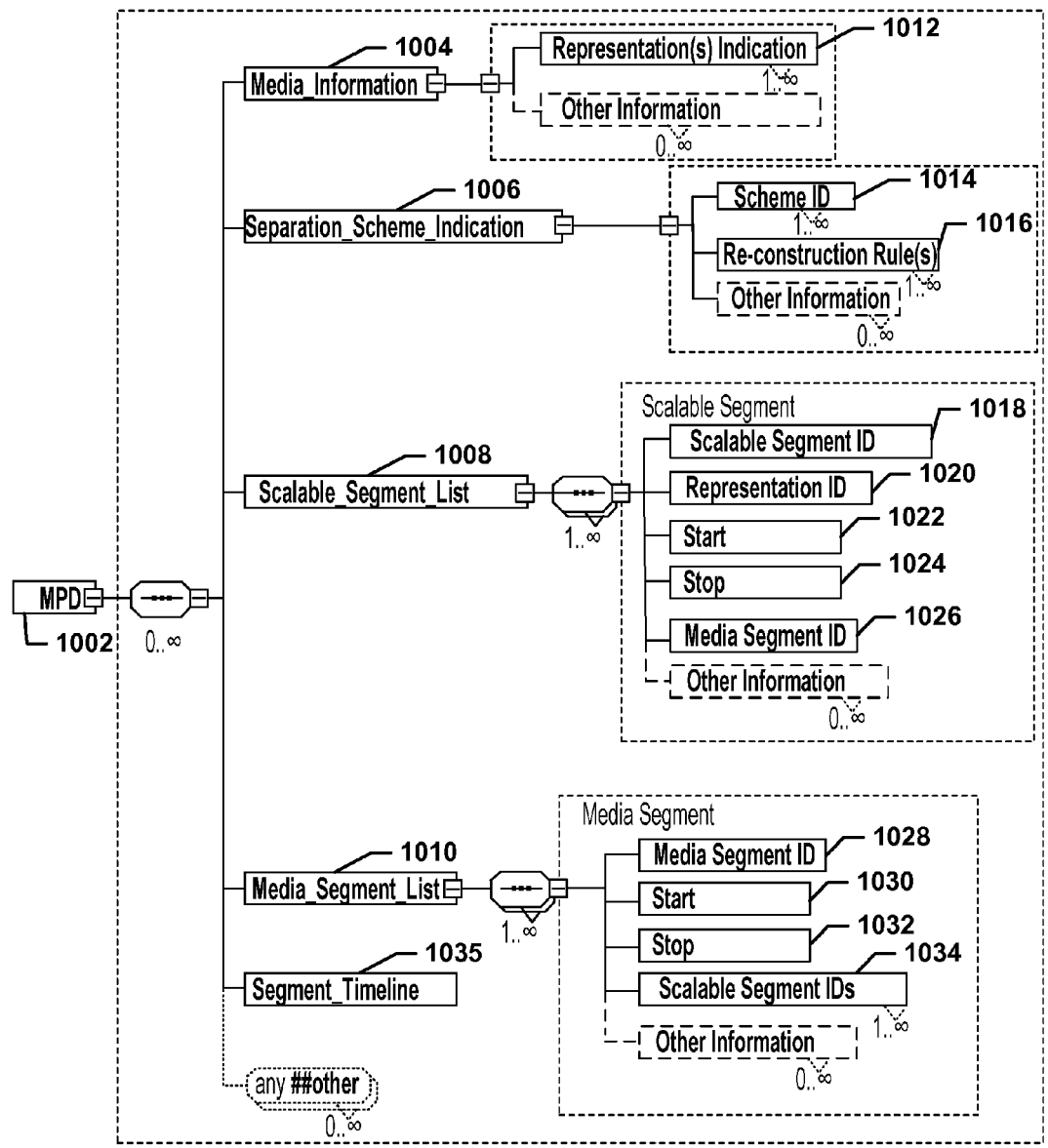
FIG. 10 is a data structure diagram illustrating potential elements of a playlist file.

FIG. 10 is a data structure diagram illustrating elements of a playlist file 1002, such as an MPD, according to an embodiment. The playlist file 1002 may include media information 1004, such as indications of the representation(s) 1012. The playlist file 1002 may include a separation scheme indication 1006. The separation scheme indication 1006 may include one or more separation scheme IDs 1014 and reconstruction rule(s) 1016. The playlist file 1008 may include a scalable segment list 1008. The scalable segment list 1008 may include the scalable segment IDs 1018, corresponding representation IDs 1020, start time of a scalable segment 1022, end time of a scalable segment 1022, and corresponding media segment IDs 1026. The playlist file 1008 may include a media segment list 1010. The media segment list 1010 may include a media segment ID 1028, a media segment start time 1030, a media segment stop time 1032, and corresponding scalable segment IDs 1034. The playlist file 1008 may include a segment timeline 1035 which may list the order of each segment and/or each scalable segment.

Figure 11:
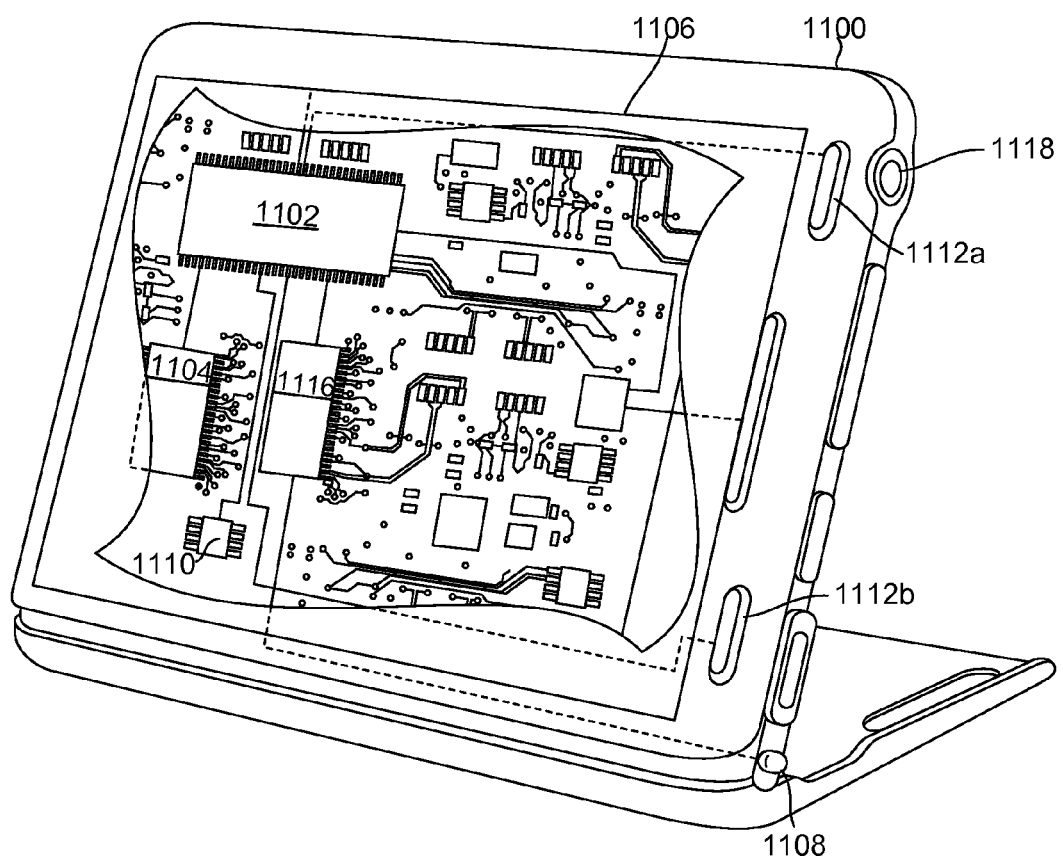
FIG. 11 is a component diagram of an example mobile device suitable for use with the various embodiments.

The various embodiments may be implemented in any of a variety of mobile devices, an example of which is illustrated in FIG. 11. For example, the mobile device 1100 may include a processor 1102 coupled to internal memories 1104 and 1110. Internal memories 1104 and 1110 may be volatile or non-volatile memories, and may also be secure and/or encrypted memories, or unsecure and/or unencrypted memories, or any combination thereof. The processor 1102 may also be coupled to a touch screen display 1106, such as a resistive-sensing touch screen, capacitive-sensing touch screen infrared sensing touch screen, or the like. Additionally, the display of the mobile device 1100 need not have touch screen capability. Additionally, the mobile device 1100 may have one or more antenna 1108 for sending and receiving electromagnetic radiation that may be connected to a wireless data link and/or cellular telephone transceiver 1116 coupled to the processor 1102. The mobile device 1100 may also include physical buttons 1112a and 1112b for receiving user inputs. The mobile device 1100 may also include a power button 1118 for turning the mobile device 1100 on and off.

Figure 12:
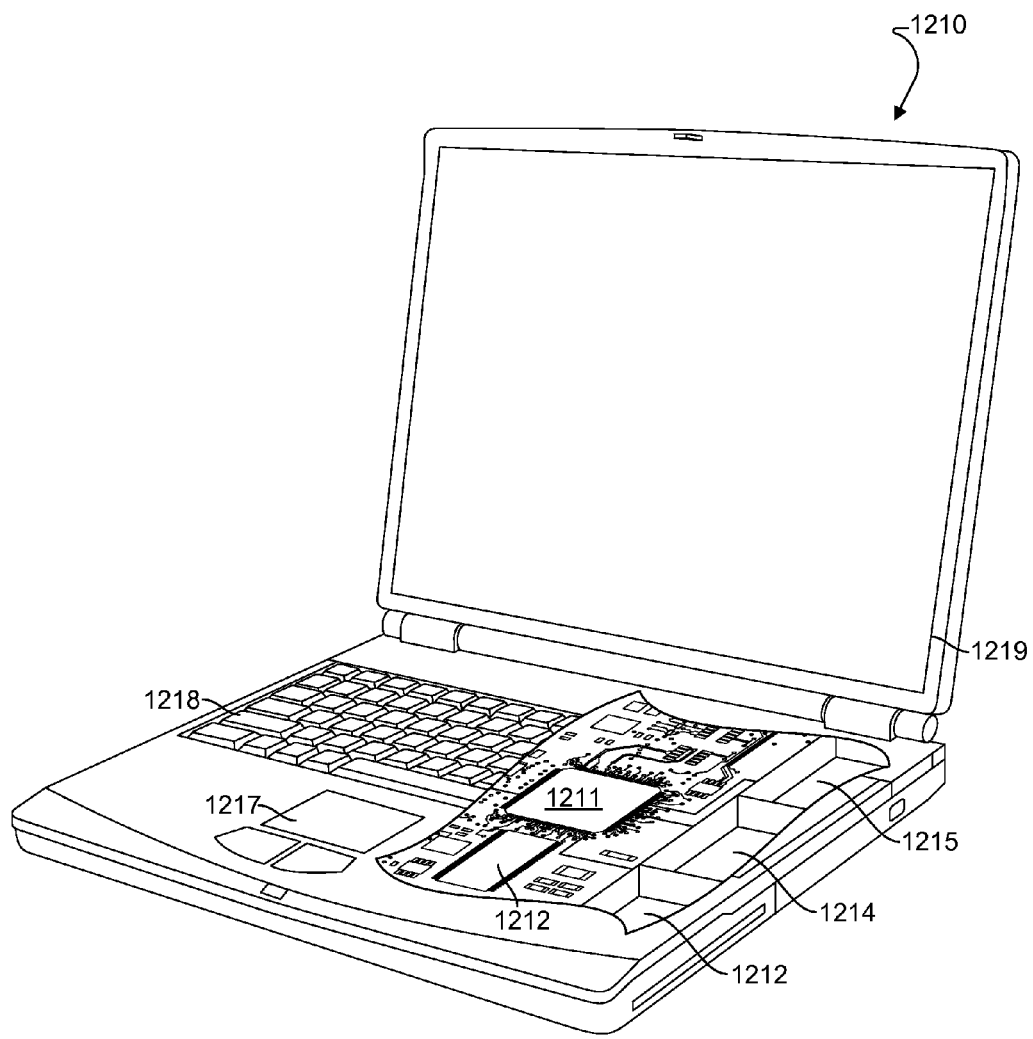
FIG. 12 is a component diagram of another example mobile device suitable for use with the various embodiments.

The various embodiments described above may also be implemented within a variety of personal computing devices, such as a laptop computer 1210 as illustrated in FIG. 12. Many laptop computers include a touch pad touch surface 1217 that serves as the computer's pointing device, and thus may receive drag, scroll, and flick gestures similar to those implemented on mobile computing devices equipped with a touch screen display and described above. A laptop computer 1210 will typically include a processor 1211 coupled to volatile memory 1212 and a large capacity nonvolatile memory, such as a disk drive 1212 of Flash memory. The computer 1210 may also include a floppy disc drive 1214 and a compact disc (CD) drive 1215 coupled to the processor 1211. The computer device 1210 may also include a number of connector ports coupled to the processor 1211 for establishing data connections or receiving external memory devices, such as a USB or FireWire® connector sockets, or other network connection circuits for coupling the processor 1211 to a network. In a notebook configuration, the computer housing includes the touchpad 1217, the keyboard 1218, and the display 1219 all coupled to the processor 1211. Other configurations of the computing device may include a computer mouse or trackball coupled to the processor (e.g., via a USB input) as are well known, which may also be use in conjunction with the various embodiments.

Figure 13:
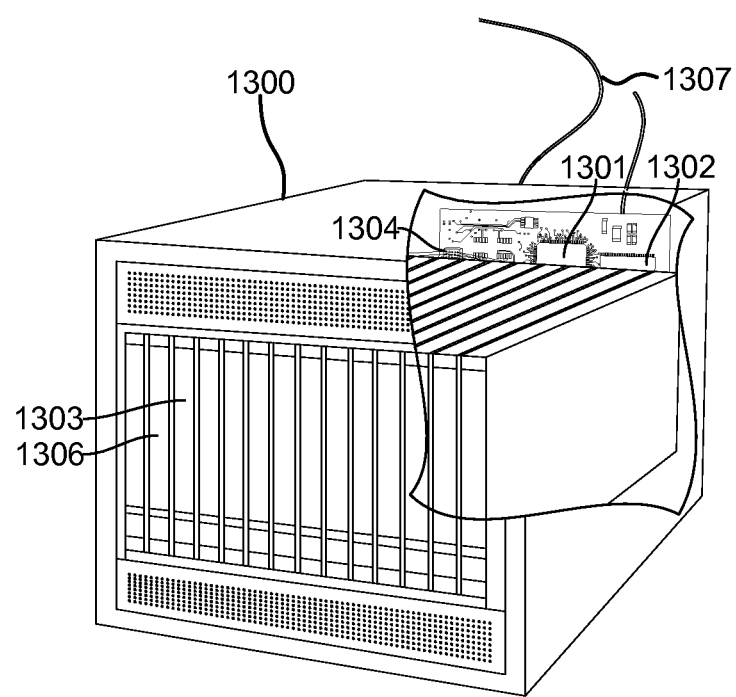
FIG. 13 is a component diagram of an example server suitable for use with the various embodiments.

The various embodiments may also be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1306 coupled to the processor 1301. The server 1300 may also include network access ports 1304 coupled to the processor 1301 for establishing network interface connections with a network 1307, such as a local area network coupled to other broadcast system computers and servers.

The processors 1102, 1211, and 1301 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1104, 1110, 1212, 1213, 1302, and 1303 before they are accessed and loaded into the processors 1102, 1211, and 1301. The processors 1102, 1211, and 1301 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1102, 1211, and 1301 including internal memory or removable memory plugged into the device and memory within the processor 1102, 1211, and 1301 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps;

these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable, server-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for presenting video on a receiver device including a client, the method comprising:
    by the client of the receiver device:
        receiving a proper subset of a set of temporally-overlapping scalable segments in at least two video transport files, wherein each of the at least two video transport files includes interleaved scalable segments derived from at least two video segments of a video stream, the proper subset including an amount of data sufficient to enable the client to render the at least two video segments at or above a quality threshold using only the proper subset, wherein the set of temporally-overlapping scalable segments are derived from the at least two video segments such that recombining all the set of temporally-overlapping scalable segments will result in playback of the at least two video segments at an original resolution of the video stream, and wherein each of the at least two video transport files is received at different times;
        determining that at least one of the set of temporally-overlapping scalable segments is lost; and
        in response to determining that at least one of the set of temporally-overlapping scalable segments is lost, using the received proper subset of temporally-overlapping scalable segments to render the at least two video segments at or above the quality threshold.

2. The method of claim 1, further comprising:
    by the client of the receiver device:
        receiving an indication of a scheme that was used to derive the set of temporally-overlapping scalable segments from the at least two video segments.

3. The method of claim 2, wherein using the received proper subset of temporally-overlapping scalable segments to render the at least two video segments at or above the quality threshold comprises:
    processing, based on the received indication, the received proper subset of temporally-overlapping scalable segments.

4. The method of claim 3, wherein the received indication indicates that the set of temporally-overlapping scalable segments were derived from the at least two video segments by applying a temporal separation scheme to the at least two video segments to separate the at least two video segments into the set of temporally-overlapping scalable segments.

5. The method of claim 4, wherein receiving an indication of a scheme that was used to derive the set of temporally-overlapping scalable segments from the at least two video segments comprises:
    receiving a playlist file including the indication.

6. The method of claim 5, wherein the client of the receiver device is a Dynamic-Adaptive Streaming over HTTP (DASH) client and the playlist file is a Media Presentation Description (MPD).

7. The method of claim 3, wherein the received indication indicates that the set of temporally-overlapping scalable segments were derived from the at least two video segments by applying a spatial separation scheme to the at least two video segments to separate the at least two video segments into the set of temporally-overlapping scalable segments.

8. The method of claim 7, wherein receiving an indication of a scheme that was used to derive the set of temporally-overlapping scalable segments from the at least two video segments comprises:
receiving a playlist file including the indication.

9. The method of claim 8, wherein the client of the receiver device is a Dynamic-Adaptive Streaming over HTTP (DASH) client and the playlist file is a Media Presentation Description (MPD).

10. The method of claim 1, wherein the quality threshold is based on a probability of a burst file loss in sending the set of temporally-overlapping scalable segments to the receiver device.

11. The method of claim 1, wherein the quality threshold is such that the client of the receiver device renders the at least two video segments without a user perceptible quality degradation.

12. The method of claim 1, wherein the quality threshold is such that the client of the receiver device renders the at least two video segments without a stall during playback by the client of the receiver device.

13. The method of claim 1, wherein the proper subset of temporally-overlapping scalable segments consists of one scalable segment.

14. The method of claim 1, wherein the proper subset of temporally-overlapping scalable segments consists of multiple scalable segments.

15. A method comprising:
by a server:
deriving a set of temporally-overlapping scalable segments from at least two video segments of a video stream, a proper subset of the set of temporally-overlapping scalable segments including an amount of data sufficient to enable a client of a receiver device to render the at least two video segments at or above a quality threshold using only the proper subset, wherein the set of temporally-overlapping scalable segments are derived from the at least two video segments such that recombining all the set of temporally-overlapping scalable segments will result in playback of the at least two video segments at an original resolution of the video stream; and
sending, to the receiver device in at least two video transport files, the set of temporally-overlapping scalable segments, wherein each of the at least two video transport files includes interleaved scalable segments derived from the at least two video segments and each of the at least two video transport files is transmitted at different times.

16. The method of claim 15, further comprising sending, to the receiver device, an indication of a scheme that was used to derive the set of temporally-overlapping scalable segments from the at least two video segments.

17. The method of claim 16, wherein the client of the receiver device is configured to use the proper subset of temporally-overlapping scalable segments to render the at least two video segments at or above the quality threshold by processing, based on the sent indication, the proper subset of temporally-overlapping scalable segments.

18. The method of claim 17, wherein the sent indication indicates that the set of temporally-overlapping scalable segments were derived from the at least two media video segments by applying a temporal separation scheme to the at least two video segments to separate the at least two video segments into the set of temporally-overlapping scalable segments.

19. The method of claim 18, wherein sending, to the receiver device, an indication of a scheme that was used to derive the set of temporally-overlapping scalable segments from the at least two video segments comprises:
sending, the receiver device, a playlist file including the indication.

20. The method of claim 19, wherein the client of the receiver device is a Dynamic-Adaptive Streaming over HTTP (DASH) client and the playlist file is a Media Presentation Description (MPD).

21. The method of claim 17, wherein the sent indication indicates that the set of temporally-overlapping scalable segments were derived from the at least two media video segments by applying a spatial separation scheme to the at least two video segments to separate the at least two video segments into the set of temporally-overlapping scalable segments.

22. The method of claim 21, wherein receiving an indication of a scheme that was used to derive the set of temporally-overlapping scalable segments from the at least two video segments comprises:
receiving a playlist file including the indication.

23. The method of claim 22, wherein the client of the receiver device is a Dynamic-Adaptive Streaming over HTTP (DASH) client and the playlist file is a Media Presentation Description (MPD).

24. The method of claim 15, wherein deriving a set of temporally-overlapping scalable segments from at least two video segments comprises:
applying a temporal separation scheme to the at least two video segments to separate the at least two video segments into the set of temporally-overlapping scalable segments.

25. The method of claim 15, wherein deriving a set of temporally-overlapping scalable segments from at least two video segments comprises:
applying a spatial separation scheme to the at least two video segments to separate the at least two video segments into the set of temporally-overlapping scalable segments.

26. The method of claim 15, wherein the quality threshold is based on a probability of a burst file loss in sending the set of temporally-overlapping scalable segments to the receiver device.

27. The method of claim 15, wherein the client of the receiver device is configured to, at the quality threshold, render the at least two video segments without a user perceptible quality degradation.

28. The method of claim 15, wherein the client of the receiver device is configured to, at the quality threshold, render the at least two video segments without a stall during playback by the client of the receiver device.

29. The method of claim 15, wherein the proper subset of temporally-overlapping scalable segments consists of one scalable segment.

30. The method of claim 15, wherein the proper subset of temporally-overlapping scalable segments consists of multiple scalable segments.

31. A system comprising:
a server comprising:
  means for deriving a set of temporally-overlapping scalable segments from at least two video segments of a video stream, a proper subset of the set of temporally-overlapping scalable segments including an amount of data sufficient to enable a receiver device to render the at least two video segments at or above a quality threshold using only the proper subset, wherein the set of temporally-overlapping scalable segments are derived from the at least two video segments such that recombining all the set of temporally-overlapping scalable segments will result in playback of the at least two video segments at an original resolution of the video stream; and
  means for sending the set of temporally-overlapping scalable segments in at least two video transport files such that each of the at least two video transport files includes interleaved scalable segments derived from the at least two video segments and each of the at least two video transport files is transmitted at different times; and
a receiver device comprising:
  means for receiving the proper subset of the set of temporally-overlapping scalable segments in the at least two video transport files;
  means for determining that at least one of the set of temporally-overlapping scalable segments is lost; and
  means for, in response to determining that at least one of the set of temporally-overlapping scalable segments is lost, using the received proper subset of temporally-overlapping scalable segments to render the at least two video segments at or above the quality threshold.

32. The system of claim 31, wherein the receiver device further comprises:
  means for receiving an indication of a scheme that was used to derive the set of temporally-overlapping scalable segments from the at least two video segments.

33. The system of claim 32, wherein means for, in response to determining that at least one of the set of temporally-overlapping scalable segments is lost, using the received proper subset of temporally-overlapping scalable segments to render the at least two video segments at or above the quality threshold comprises:
  means for processing, based on the received indication, the received proper subset of temporally-overlapping scalable segments.

34. The system of claim 33, wherein means for receiving an indication of a scheme that was used to derive the set of temporally-overlapping scalable segments from the at least two video segments comprises:
  means for receiving a playlist file including the indication.

35. The system of claim 34, wherein the client of the receiver device is a Dynamic-Adaptive Streaming over HTTP (DASH) client and the playlist file is a Media Presentation Description (MPD).

36. The system of claim 33, wherein the proper subset of temporally-overlapping scalable segments consists of one scalable segment.

37. The system of claim 33, wherein the proper subset of temporally-overlapping scalable segments consists of multiple scalable segments.

38. A receiver device comprising:
a memory; and
a processor coupled to the memory, the processor configured with processor-executable instructions to perform operations comprising:
  receiving a proper subset of a set of temporally-overlapping scalable segments in at least two video transport files, wherein each of the at least two video transport files includes interleaved scalable segments derived from at least two video segments of a video stream, the proper subset including an amount of data sufficient to enable the client to render the at least two video segments at or above a quality threshold using only the proper subset, wherein the set of temporally-overlapping scalable segments are derived from the at least two video segments such that recombining all the set of temporally-overlapping scalable segments will result in playback of the at least two video segments at an original resolutions resolution of the video stream, and wherein each of the at least two video transport files is received at different times;
  determining that at least one of the set of temporally-overlapping scalable segments is lost; and
  in response to determining that at least one of the set of temporally-overlapping scalable segments is lost, using the received proper subset of temporally-overlapping scalable segments to render the at least two video segments at or above the quality threshold.

39. A non-transitory processor-readable medium configured with processor-executable instructions to cause a processor of a receiver device to perform operations comprising:
  receiving a proper subset of a set of temporally-overlapping scalable segments in at least two video transport files, wherein each of the at least two video transport files includes interleaved scalable segments derived from at least two video segments of a video stream, the proper subset including an amount of data sufficient to enable the client to render the at least two video segments at or above a quality threshold using only the proper subset, wherein the set of temporally-overlapping scalable segments are derived from the at least two video segments such that recombining all the set of temporally-overlapping scalable segments will result in playback of the at least two video segments at an original resolution of the video stream, and wherein each of the at least two video transport files is received at different times;
  determining that at least one of the set of temporally-overlapping scalable segments is lost; and
  in response to determining that at least one of the set of temporally-overlapping scalable segments is lost, using the received proper subset of temporally-overlapping scalable segments to render the at least two video segments at or above the quality threshold.

40. A server comprising:
a memory; and
a processor coupled to the memory, the processor configured with processor-executable instructions to perform operations comprising:
  deriving a set of temporally-overlapping scalable segments from at least two video segments of a video stream, a proper subset of the set of temporally-overlapping scalable segments including an amount of data sufficient to enable a client of a receiver device to render the at least two video segments at or above a quality threshold using only the proper subset, wherein the set of temporally-overlapping scalable segments are derived from the at least two video segments on a per-video segment basis using at least two different separation schemes such that recombining all the set of temporally-overlapping scalable segments will result in playback of the at least two video segments at an original resolution of the video stream; and sending, to the receiver device in at least two video transport files, the set of temporally-overlapping scalable segments, wherein each of the at least two video transport files includes interleaved scalable segments derived from the at least two video segments and each of the at least two video transport files is transmitted at different times.

41. A non-transitory processor-readable medium configured with processor-executable instructions to cause a processor of a server to perform operations comprising:

deriving a set of temporally-overlapping scalable segments from at least two video segments of a video stream, a proper subset of the set of temporally-overlapping scalable segments including an amount of data sufficient to enable a client of a receiver device to render the at least two video segments at or above a quality threshold using only the proper subset, wherein the set of temporally-overlapping scalable segments are derived from the at least two video segments such that recombining all the set of temporally-overlapping scalable segments will result in playback of the at least two video segments at an original resolution of the video stream; and sending, to the receiver device in at least two video transport files, the set of temporally-overlapping scalable segments, wherein each of the at least two video transport files includes interleaved scalable segments derived from the at least two video segments and each of the at least two video transport files is transmitted at different times.

* * * * *